United States Patent
Cherf (10) Patent No.: US 6,178,429 B1
(45) Date of Patent: Jan. 23, 2001

(54) MECHANISM FOR ENSURING SCM DATABASE CONSISTENCY ON MULTI-PART OPERATION BOUNDARIES

(75) Inventor: Scott Cherf, Boulder Creek, CA (US)

(73) Assignee: Cisco Technology, Inc., San Jose, CA (US)

( * ) Notice: Under 35 U.S.C. 154(b), the term of this patent shall be extended for 0 days.

(21) Appl. No.: 08/978,689

(22) Filed: Nov. 26, 1997

(51) Int. Cl.[7] ................................................ G06F 17/30
(52) U.S. Cl. ........................ 707/205; 707/9; 707/200; 707/204
(58) Field of Search .................. 711/164; 395/677, 395/200.08; 705/36; 707/2, 8, 200, 201, 203, 204, 205, 202, 1, 100, 9; 709/104, 229, 13; 710/240; 714/1, 5

(56) References Cited

U.S. PATENT DOCUMENTS

| | | | |
|---|---|---|---|
| 5,093,912 | * 3/1992 | Dong et al. | 709/104 |
| 5,163,147 | * 11/1992 | Orita | 707/9 |
| 5,305,448 | * 4/1994 | Insalaco et al. | 711/164 |
| 5,421,012 | * 5/1995 | Khoyi et al. | 395/677 |
| 5,452,448 | * 9/1995 | Sakuraba et al. | 707/201 |
| 5,463,754 | * 10/1995 | Beausoleil et al. | 395/200.08 |
| 5,513,351 | * 4/1996 | Grantz | 707/200 |
| 5,564,051 | * 10/1996 | Halliwell et al. | 707/200 |
| 5,584,023 | * 12/1996 | Hsu | 707/204 |
| 5,604,900 | * 2/1997 | Iwamoto et al. | 707/205 |
| 5,608,898 | * 3/1997 | Turpin et al. | 707/201 |
| 5,619,691 | * 4/1997 | Katada et al. | 707/204 |
| 5,623,662 | * 4/1997 | McIntosh | 707/204 |
| 5,692,194 | * 11/1997 | Nguyen et al. | 709/300 |
| 5,701,457 | * 12/1997 | Fujiwara | 707/8 |
| 5,708,780 | * 1/1998 | Levergood et al. | 709/229 |
| 5,727,206 | * 3/1998 | Fish et al. | 707/202 |
| 5,742,830 | * 4/1998 | Elko et al. | 710/240 |
| 5,749,077 | * 5/1998 | Campbell | 705/36 |
| 5,778,365 | * 7/1998 | Nishiyama | 707/9 |
| 5,799,141 | * 8/1998 | Galipeau et al. | 714/13 |
| 5,826,253 | * 10/1998 | Bredenberg | 707/2 |
| 5,832,512 | * 11/1998 | Mastors et al. | 707/202 |
| 5,832,522 | * 11/1998 | Blickenstaff et al. | 707/204 |
| 5,835,601 | * 11/1998 | Shimbo et al. | 380/49 |
| 5,835,911 | * 11/1998 | Nakagawa et al. | 707/203 |
| 5,873,103 | * 2/1999 | Trede et al. | 707/204 |
| 5,895,461 | * 4/1999 | De La Huerga et al. | 707/1 |
| 5,924,098 | * 7/1999 | Kluge | 707/100 |
| 6,021,415 | * 2/2000 | Cannon et al. | 707/206 |

\* cited by examiner

Primary Examiner—Wayne Amsbury
Assistant Examiner—Thuy Pardo
(74) Attorney, Agent, or Firm—D'Alessandro & Ritchie (57) ABSTRACT

A mechanism for guaranteeing a coherent repository, including a list of requested files that are to be committed to the repository or to be processed (e.g. read) by an operation, and a list of "protected" files that are currently being processed. Either all of or none of the requested files are committed or are processed. Therefore, if any one of the requested files is in the protected-files list, then the invention waits until none of the requested files is protected before committing the requested files to the repository or before processing the requested files. An abnormal operation may hold up the protected files in the protected-files list for an unreasonably-long period of time. The invention thus provides an alarm mechanism, which scans the protected-files list to detect whether an abnormal operation exists. If such an operation is found, then the invention alerts an alarm agent and replaces the inconsistent files caused by the abnormal operation. The invention uses an atomic operation to change the requested-files list to a prenatal-file list, then to the protected-files list, and finally to a deceased-files list.

47 Claims, 5 Drawing Sheets

MECHANISM FOR ENSURING SCM DATABASE CONSISTENCY ON MULTI-PART OPERATION BOUNDARIES

BACKGROUND OF THE INVENTION

1. Technical Field

The present invention relates generally to software development and more particularly to software con figuration management databases.

2. Discussion of Prior Art

Software products are often developed by hundreds or thousands of people. To manage this increasingly complex process, software development is handled by project teams. In addition to the team working on the current product, there may be a team that handles support for a previously released product, a team working on specialized versions of a product for specific customers, and a team handling future releases. Each of these teams may also be currently building numerous versions.

This has necessitated a distributed approach to development. Rather than incorporating all of the code for a software system into a single file, developers create smaller files that handle smaller parts of an overall system. Thus, one file may depend on a number of different files or objects. Therefore, changes to one file may affect the operation of other files in a product build. Changes to these interrelated files collected in a repository are called a "change set" and together they represent the progress of a program from one coherent state to another.

This complexity has necessitated the use of project databases called software configuration management (SCM) systems. Commercial SCM software is used to manage these databases and to help insure that a change set is updated and committed to the database all at once. In order to accomplish this task, SCM software usually provides version control, workspace management, build management, and process control.

Although SCM software is helpful, some problems are not addressed. Of particular concern is the duration of multi-part operations, which is the time between the initiation of a change to a set of files (start boundary) and the time it is completed (end boundary). During that time, some of the change set files have been updated while others have not. Thus, the repository is in an incoherent state and should not be used to build a working product. In order to prevent accidental reads or writes during an update, most SCM software employs a file-locking mechanism.

One prior art solution places write file locks (wfl) on each directory that will be modified during an update. Although this prevents incoherence during and after an update, there is no guarantee that files read just prior to the update will be consistent with other files read after the update. Although it is unlikely, if an update reads one directory before a commit places a wfl on that directory, and then, after a commit places a wfl on a second directory, the update attempts to read the second list, then when the update logic encounters the wfl, the update logic waits for the wfl to clear and then reads that part of the change into the updated workspace. This results in an incoherence that may or may not be detected when the workspace is used to build the product. This incoherence problem is exacerbated when the user or programmer is working on a project at a remote site, in which case he or she must retrieve the entire change set. Remote retrieval is slower and therefore opens a longer time window of opportunity for an incoherent set.

In addition to the locking method described above, some SCM software locks individual element versions during a write operation. Although protecting a transaction at the element version level guarantees either complete success or complete failure as to an individual file, it is possible for a multi-part transaction to write only some of the files involved. This leaves the repository incoherent. While reading an incoherent file of a file set is problematic, having an incoherent file set stored in the repository is potentially disastrous.

There remains, therefore, a need for a mechanism to guarantee coherent views of a repository at the beginning and ending boundaries of multi-part operations. Additionally, a method is needed for detecting and recovering from repository inconsistencies caused by system failures during multi-part operations.

SUMMARY OF THE INVENTION

The present invention provides a mechanism for guaranteeing a coherent view of a repository being updated. The invention also detects and corrects stalled file operations caused by system failures. The system of the invention creates a list of files that are currently being committed or updated to a shared repository. Other users are then prevented from accessing any of the protected files on the list until the operation has been completed. The invention also identifies failed operations and restores committed files to their original state.

In the preferred embodiment, a directory is created that contains a list of files that are protected. When an operating request involving shared files is sent to the repository, the files requested are compared to the files in the protected files list to see if any of the files being requested is currently being processed by another request. Comparing the files can include comparing the name, version information, or any other relevant file properties. If the files are not being protected, then the requested operation on the shared files completes. Since the current contents of the protected files list are examined before submitting an operation, no two operations can act on the same protected file.

Additionally, to prevent a stalled update operation from leaving a file in protected status indefinitely, an alarm mechanism regularly scans the protected files list and flags operations that have taken an unusually long time. If the alarm mechanism locates a stalled operation, it initiates a system agent and gives it information about the stalled operation. The information about the stalled operation might include the time the files were placed in protected status, information about the user that initiated the request, and the status of the update before the failure. Therefore if the operation failed after updating some of the files in a change set, the system agent can recover by the original files and re-establish coherence before others use the partially updated set. The operation can then be restarted without risking further inconsistencies in the repository.

DETAILED DESCRIPTION OF THE PREFERRED EMBODIMENT

Figure 1:
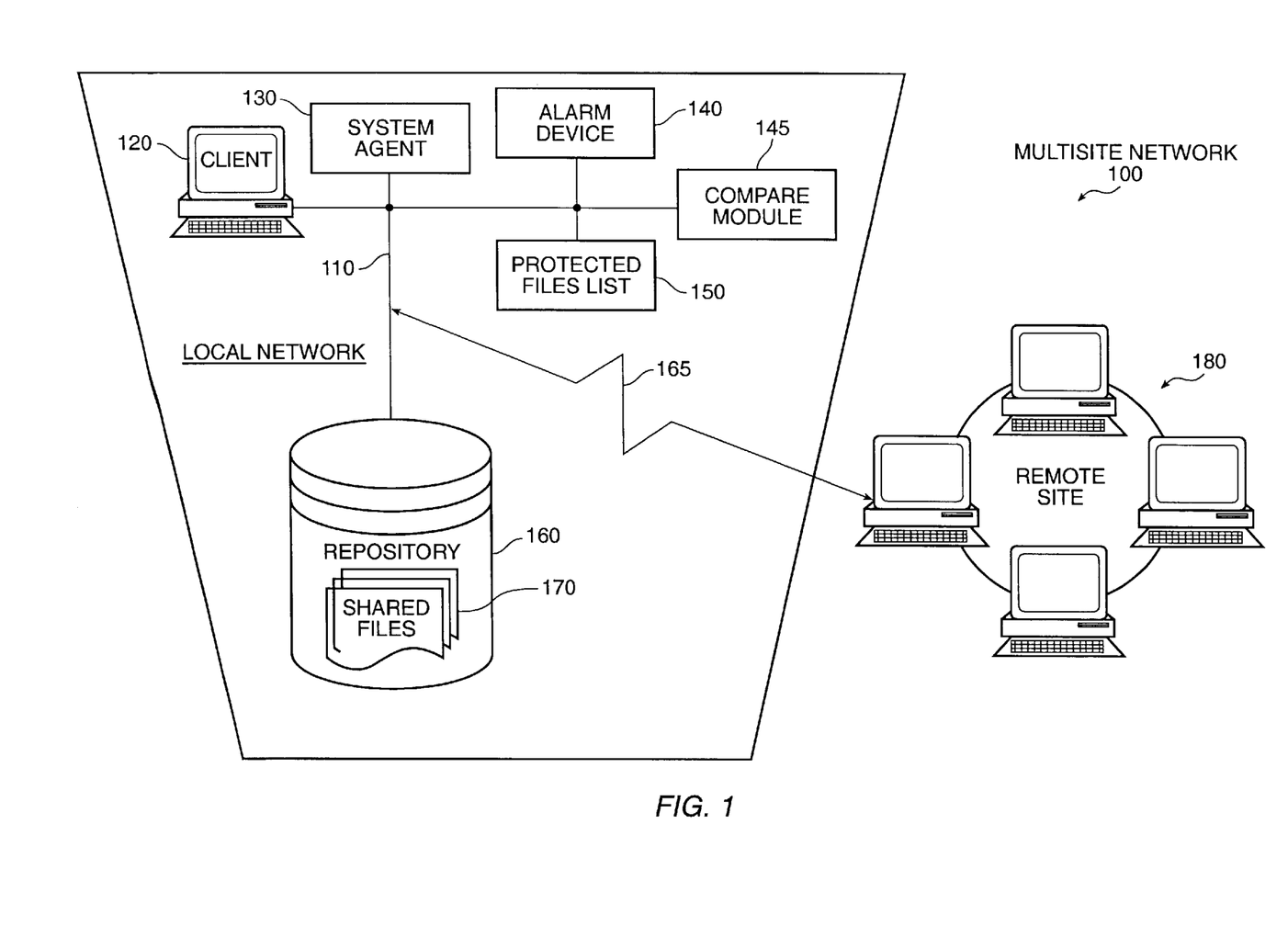
FIG. 1 is an illustration of a multi-site network that uses the present invention.

The present invention provides a system and a method for maintaining a coherent view of a repository at the beginning and ending boundaries of a multi-part operation. As illustrated in FIG. 1, a multi-site network 100 preferably includes a local network 110 inter connecting a client 120, a system agent 130, an alarm device 140, a compare module 145, a protected files list 150 and a repository 160 storing shared files 170. The multi-site network 100 also includes a communications channel 165 linking the local network 110 to a remote site 180.

Although the remote site 180 is described with reference to a remote network of users, those skilled in the art recognize that a remote site 180 could include any number of users connected by a communications channel 165. Users at the remote site send requests, including updates and commit operations, over the communication channel 165 to the repository 160. Requests could also be sent by a remote computer or any other device. In the interest of brevity, both the user and networked device will be referred to as the "client." Requests sent from the client at the remote site 180 are often affected by communications delay (lag) over the communications channel 165. When lag is present, the probability that a client will have read one file of a set before the one file is updated and read another file in the set after that other file is updated is increased. The present invention eliminates this problem by implementing a file lock mechanism that can, using a single atomic operation, lock a set of files. Since the problems associated with lag are eliminated, the scalability of the network, or the ability of the network to grow, is enhanced significantly, which allows increased flexibility in designing and implementing networks.

The local network 110 has a protected files list 150 that contains the names of files currently being updated or committed to the shared repository 160. When a client sends a request involving shared files 170 to the repository 160, the repository creates a requested files list (not shown) having the names and versions of the files to be processed. The compare module 145 compares the requested files list to the names in the protected files list 150 to see if any of the files being requested is currently being processed for another update request. If not, then the compare module allows the request to proceed. Since the current contents of the protected files list 150 are examined before submitting an operation, no two operations could destructively act on the same file without the other operation completing. After the operation updates the files, the file names are removed from the protected files list 150.

The local network 110 is also connected to an alarm device 140. The alarm device 140 and the agent 130 are both preferably also connected to the protected files list 150. To prevent a stalled update from leaving a file in protected status indefinitely, the alarm device 140 regularly scans the protected files list 150 and flags operations that have taken an unusually long time. If the alarm device 140 locates a stalled operation, the alarm device 140 initiates the system agent 130 and gives it information about the stalled operation. The information about the stalled operation might include the time the files were placed in protected status, the identity of the user that initiated the request, and the status of the update before the stall. Therefore, if the operation failed after updating some of the files in a change set, the system agent 130 can recover the original files and re-establish coherence before the partially updated set is used by others. The update operation can be restarted later without risking further inconsistencies in the repository 160.

Figure 2:
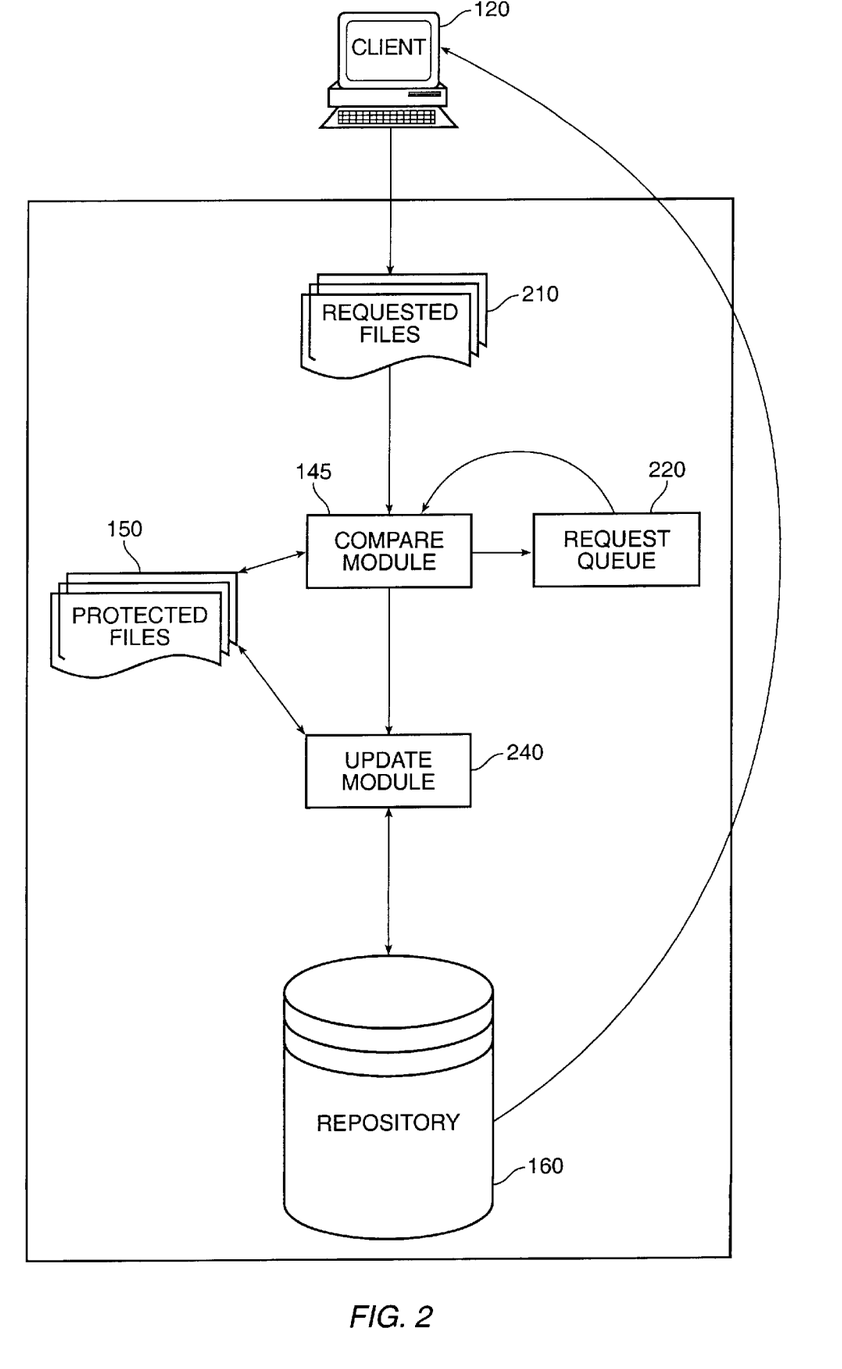
FIG. 2 is a block diagram illustrating the system for requesting files according to the present invention.

FIG. 2 is a diagram illustrating the process of retrieving files from the shared repository 160 according to the present invention. The retrieval system 200 includes the protected files list 150, the shared repository 160, a list of requested files 210, a request queue 220, a compare module 145 and an update module 240.

A list of requested files 210 contains the names of files that are being requested, such as files being read from the shared file repository 160, on the local network 110. Files can be requested by a user or by a program running on the network. The compare module 145 receives the transmitted requested files list 210. If any of the files requested are on the protected files list 150, the compare module places the request in the request queue 220 until the operation using the files has completed. The compare module 145 continuously polls the protected files list 150 until the compare module 145 determines that none of the files requested are currently on the list. Once the compare module 145 determines that none of the files requested are being updated or committed, the compare module returns the contents of the requested files 210 list to the requesting client 120.

Figure 3:
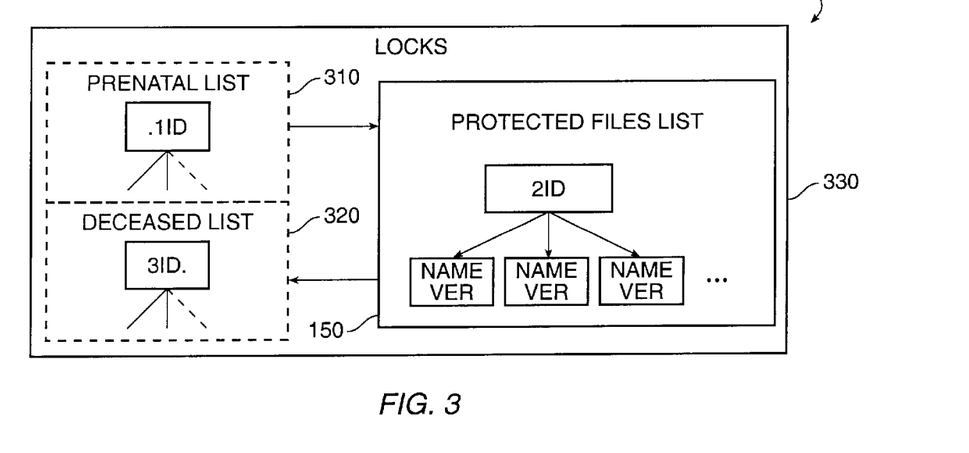
FIG. 3 is a block diagram illustrating a protected files list generated by the present invention.

FIG. 3 illustrates the preferred embodiment of a locks directory 330 that contains three lists: the protected file list 150, the prenatal file list 310, and the deceased file list 320. A prenatal list 310 is preferably a subdirectory or list of files named according to the so-called prenatal format which, in this example, is a period placed at the beginning of the list name. Client 120 (FIG. 1 or 2) requests one or more files by sending the names of the requested files and the corresponding version information to the repository 160. The repository 160 adds this information to the prenatal list 310. Once the compare module 145 has determined that none of the files requested are currently protected, the list is renamed to a format designated as the protected list format. In this example, the period is removed from the front of the list name. By renaming the lists in this manner, a list of files can be placed in protected status in an atomic operation. Being able to send a single instruction to protect any number of files eliminates the remote user's problem of an incoherent repository caused by communications lag.

Once the files are placed in protected status, the repository 160 processes the request. Once the request has completed, the corresponding list is renamed to the deceased format. In this example, the deceased format contains a period at the end of the list name. The deceased list 320 can now be removed from the locks directory 330 and the update process is complete. The deceased list 320 can also be retained as an audit file since it provides a record of the requests submitted to the repository 160. Although the preferred embodiment is a directory tree structure, those skilled in the art will recognize that different implementations could use, for example, a text file, an html file, or a set of virtual pointers.

Figure 4:
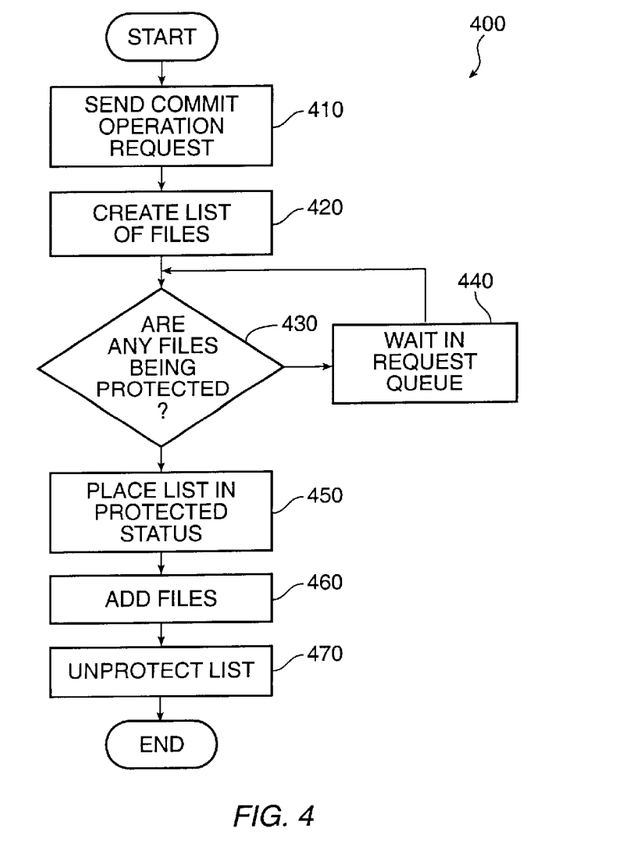
FIG. 4 is a flowchart demonstrating elements being updated or committed to a repository.

FIG. 4 is a flowchart illustrating the steps in a method 400 for committing files to a repository 160. Method 400 begins in step 410 with a client 120 (FIG. 1 or 2) sending a request for committing files to the repository 160. The repository 160 in step 420 uses the request information, including the name and version of the files to be committed, to create and submit a requested files list 210. The requested files list 210 can also be created by a software application or can be entered manually by the user sending the request. Once the list has been submitted, in step 430 the files are compared to the protected files list 150. If the requested files list 210 contains protected files, then in step 440 the request is placed in a queue. Otherwise, in step 450, the requested files list 210 is placed in protected status as was explained with reference to FIG. 3. In step 460, the files to be committed are added to the repository 160. Later, when the files have all been updated, the requested files are "unprotected" (placed in deceased status) in step 470 and are removed from the locks directory 330.

Figure 5:
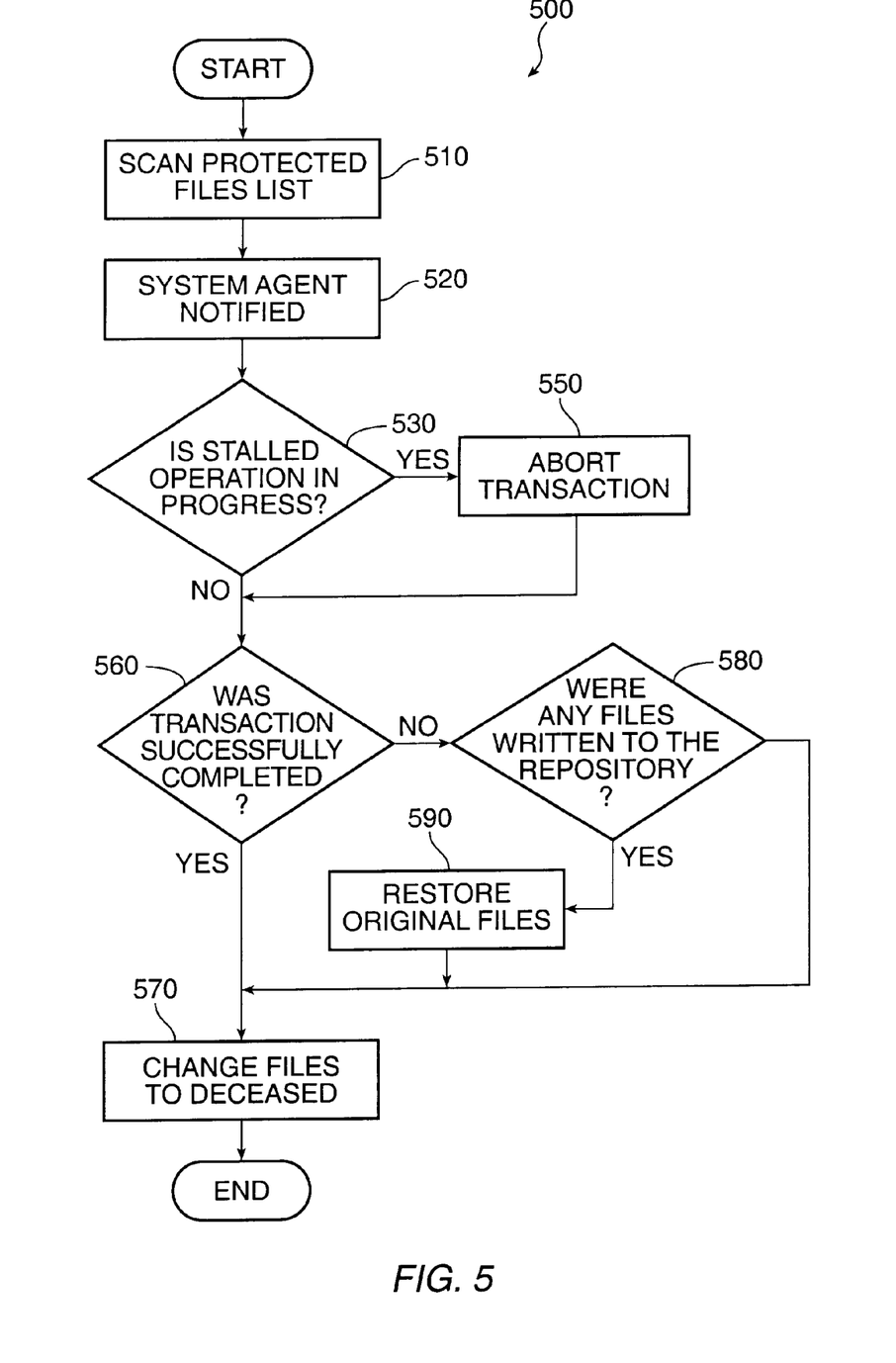
FIG. 5 is a flowchart illustrating the process of removing stalled files from the protected files list.

The FIG. 5 flowchart illustrates the method 500 for detecting and recovering from repository 160 inconsistencies caused by failed or stalled multi-part operations. As described above with reference to FIG. 1, to prevent a stalled update from leaving a file indefinitely in protected status, in step 510 an alarm device 140 regularly scans the protected files list and flags operations that have taken an unusually long time. If the alarm device 140 locates an operation that has exceeded its allotted time, then in step 520 the alarm device transmits a notification, including information about the operation, to the system agent 130. In step 530 the system agent 130 examines the stalled operation and determines whether the stalled operation is still in progress. If it is still in progress, then in step 550 system agent 130 aborts the operation. If the operation is not still in progress, the system agent 130 in step 560 determines whether the operation successfully completed its processing. This might involve comparing the files that were part of the request to the files in the repository 160. If all of the files have been successfully added to the repository 160, then in step 570 the repository 160 changes the status of the requested files list to deceased and the files are again available to other users. If not, then in step 580 the system agent 130 determines whether any of the files were committed to the repository 160. If some of the files have been committed while others have not, then the system agent 130 in step 590 restores the original files in order to guarantee that a coherent view of the repository 160 is maintained. After the original files are restored, in step 570 the status of the requested files list is changed to deceased and the requested file list is removed from the network 110. Therefore, the repository 160 is coherent in spite of system failures or network malfunctions.

Figure 6:
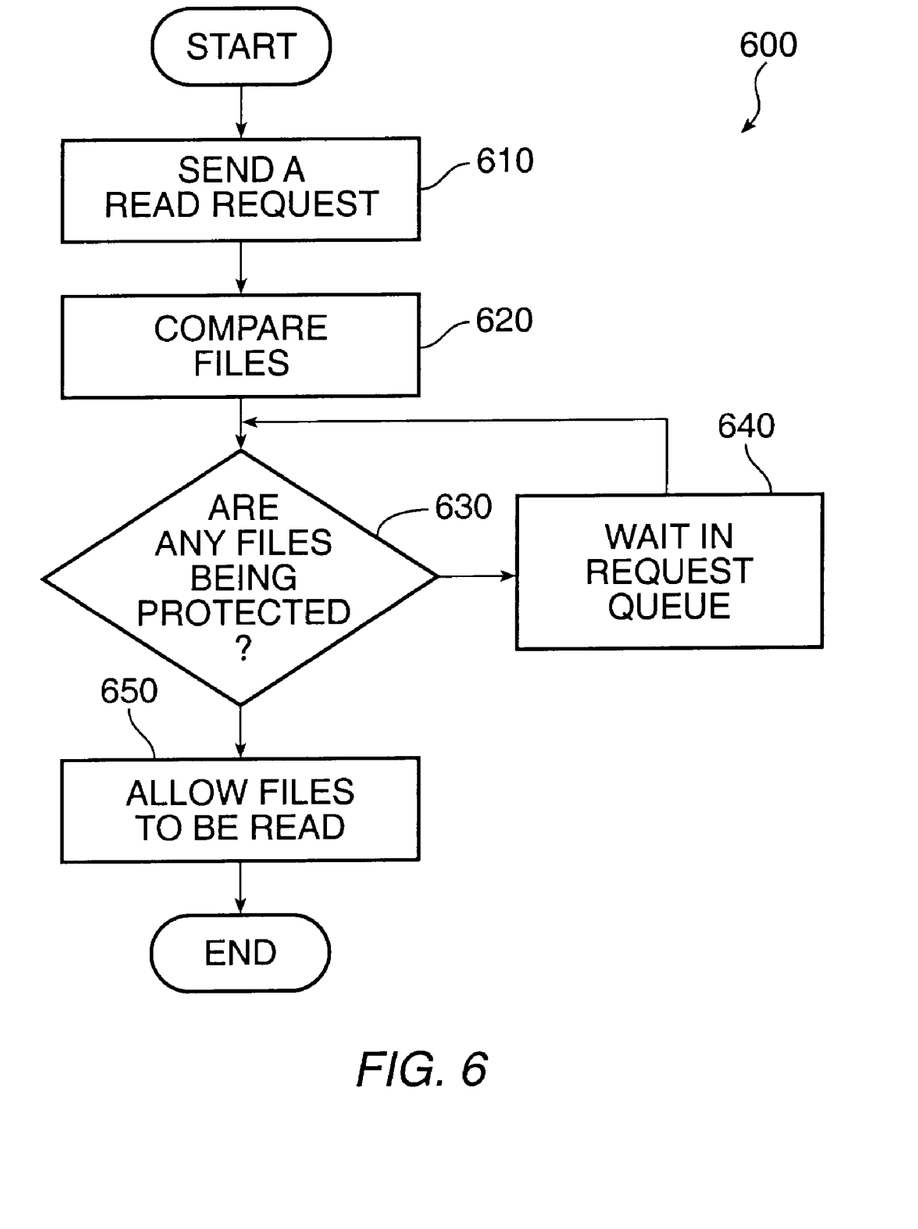
FIG. 6 is a flow chart illustrating the process of reading files from repository.

Referring now to FIG. 6, a flowchart illustrating the method 600 of reading files from a repository 160 is shown. This method works in conjunction with the protected file list 150 created using the method of committing files to a repository 160. Method 600 begins in step 610 when the client 120 sends a read request to the repository 160. In the preferred embodiment, the read request includes a list of the names and properties of the requested files. In step 620, the files in the read request are compared to the files in the protected file list 160. In the preferred embodiment, comparing the files includes comparing both the names of the files and other properties of the files such as version number. If the files being requested include files that are currently being used in a process, then the request is placed in the request queue. The compare module 145 will continue comparing the file names in the read request with the protected file list 150 until none of the files requested are being updated. Once the files in the read request are available, the compare module 145 allows the files to be read by client 120. Method 600 then ends.

The invention has been explained above with reference to a preferred embodiment. Other embodiments will be apparent to those skilled in the art in light of this disclosure. Therefore, any variations upon the preferred embodiment are covered by the present invention, which is limited only by the appended claims.

What is claimed is:

1. A method for processing coherent files in a multi-part operation, comprising the steps of:
   maintaining a protected-files list of the names of files that are currently being processed;
   creating a requested-files list of the names of files to be processed in an operation;
   comparing the requested-files list to the protected-files list;
   adding the requested-files list to the protected-files list using an atomic operation when none of the names of the requested files is in the protected-files list;
   performing the multi-part operation; and
   removing the names of the requested files from the protected-files list when the operation is complete.

2. The method of claim 1 wherein the requested-files list is a directory containing the names of the requested files.

3. The method of claim 2 wherein the step of adding includes renaming the directory.

4. The method of claim 1 wherein the step of creating uses virtual pointers.

5. The method of claim 1 wherein the step of creating includes adding the name of a file and corresponding version information.

6. The method of claim 5 wherein the step of comparing compares the names and version information of the protected files and of the requested files.

7. The method of claim 1 wherein the step of comparing compares the names of the requested and the protected files.

8. The method of claim 1 wherein the step of creating uses the names of files in a change set.

9. The method of claim 1 wherein the step of removing is an atomic operation.

10. The method of claim 1 wherein the protected-files list is derived from a prenatal-files list.

11. The method of claim 1 wherein the protected-files list becomes a deceased-files list.

12. The method of claim 1 wherein the requested-files list becomes a prenatal-files list.

13. The method of claim 12 wherein the prenatal-files list becomes a protected-files list corresponding to the requested-files list.

14. The method of claim 13 wherein the protected-files list corresponding to the requested-files list becomes a deceased-files list.

15. A method for reading coherent files in a multi-part operation, comprising the steps of:
   maintaining a protected-files list of the names of files that are currently being processed;
   renaming the protected-files list to a deceased-files list after the protected files are no longer processed;
   creating a requested-files list of the names of files to be read from a repository;
   comparing the requested-files list to the protected-files list until none of the names of the requested files is in the protected-files list; and
   allowing the requested files to be read from the repository.

16. The method of claim 15 wherein the step of creating includes adding the name of the file requested and corresponding version information.

17. The method of claim 15 wherein the step of comparing compares the file names of the requested-files list with the protected-files list.

18. The method of claim 17 wherein the step of comparing compares version information of the requested-files list with the protected-files list.

19. The method of claim 15 wherein the step of creating uses the names of files in a change set.

20. The method of claim 15 wherein the protected-files list is renamed by an atomic operation.

21. The method of claim 15 wherein the step of maintaining includes the step of renaming a prenatal-files list to the protected-files list.

22. The method of claim 21 wherein the step of renaming is an atomic operation.

23. The method of claim 21 wherein each one of the prenatal-files list, the protected-files list, and the deceased-files list is a file directory.

24. The method of claim 15 wherein the deceased-files list is retained as an audit file for providing a record of files requested.

25. A method for detecting and recovering from a repository inconsistency, comprising the steps of:
  scanning a protected-files list and thereby detecting an abnormal operation associated with files in the protected-files list;
  alerting a system agent if the abnormal operation is found;
  replacing any inconsistent files caused by the abnormal operation; and
  removing a list of files that includes the any inconsistent files from the protected-files list.

26. The method of claim 25 wherein the step of scanning includes scanning the times the files were initially placed on the protected-files list.

27. The method of claim 25 wherein the step of replacing includes restoring on the protected-files list the names of replaced files.

28. The method of claim 25 wherein the step of alerting includes sending information about the abnormal operation.

29. The method of claim 27 wherein the step of restoring includes getting confirmation from a user.

30. The method of claim 25 wherein the abnormal operation is selected from a group consisting of a failed operation, a stalled operations, and an operation that has exceeded its allotted time.

31. The method of claim 25 wherein the protected-files list is derived from a prenatal-files list.

32. The method of claim 25 wherein the protected-files list becomes a deceased-files list.

33. A processing system for multi-part operations, comprising:
  a protected-files list of names of files currently being processed;
  a requested-files list of names of files that will be processed in an operation;
  means for comparing the requested-files list with the protected-files list;
  means for adding the requested-files list to the protected-files list in an atomic operation; and
  means for removing the requested-files list from the protected-files list when the multi-part operation is complete.

34. The system of claim 33 wherein the means for comparing is capable of comparing file names.

35. The system of claim 33 wherein the means for comparing is capable of comparing version numbers.

36. The system of claim 33 wherein the requested-files list is a change set.

37. The system of claim 33 wherein the requested-files list and the protected-files list are each a directory tree.

38. The system of claim 33 wherein the means for comparing is capable of comparing names and version numbers.

39. The system of claim 33 wherein the requested-files list contains a version number of each of the requested files.

40. A computer-based storage medium storing code for causing a computer to perform the steps of:
  receiving an operation request including a requested-files list of the names of requested files to be operated upon;
  comparing the requested-files list to a protected-files list;
  adding the requested-files list to the protected-files list when none of the requested files is in the protected-files list;
  processing the operation; and
  removing names of files from the protected-files list once the operation is complete.

41. The method of claim 40 wherein the requested-files list constitutes a directory.

42. The method of claim 41 wherein the step of adding includes renaming said directory.

43. The method of claim 40 wherein the step of receiving receives virtual pointers referencing the requested-files list.

44. The method of claim 40 further comprising the step of adding the names of the requested files and corresponding version information to a previously existing requested-files list.

45. The method of claim 40 further comprising the step of adding names of the requested files from a predefined change set.

46. The method of claim 40 wherein the step of comparing compares the file names and version information of the requested-files list with the protected-files list.

47. The method of claim 40 wherein the step of removing is an atomic operation.

* * * * *

UNITED STATES PATENT AND TRADEMARK OFFICE
CERTIFICATE OF CORRECTION

PATENT NO.    : 6,178,429 B1
DATED         : January 23, 2001
INVENTOR(S)   : Scott Cherf It is certified that error appears in the above-identified patent and that said Letters Patent is hereby corrected as shown below:

Column 1,
Line 9, replace "con figuration" with -- configuration --.

Column 3,
Line 32, replace "the one" with -- that --.

Column 6,
Line 18, after "list" add -- and renaming the requested-files list to a deceased format --.
Lines 28-30, replace
"6. The method of claim 5 wherein the step of comparing compares the names and version information of the protected files and of the requested files." with
-- 6.    A method for processing coherent files in a multi-part operation, comprising the steps of:
    maintaining a protected-files list of the names of files that are currently being processed;
    creating a requested-files list of the names of files to be processed in an operation;
    comparing the requested-files list to the protected-files list;
    adding the requested-files list to the protected-files list using an atomic operation when none of the names of the requested files is in the protected-files list;
    performing the multi-part operation; and
    removing the names of the requested files from the protected-files list when the operation is complete;
    wherein:
        the step of creating includes adding the name of a file and corresponding version information; and
        the step of comparing compares the names and version information of the protected files and of the requested files. --.
Line 55, after "longer" add -- being --.

Column 7,
Line 26, after "operation;" delete "and".
Line 27, replace "the" with -- said --.
Line 28, delete "." and add -- ; and
renaming the list of files to a deceased-files list after the removing step. --.
Line 53, after "operation;" add -- means for renaming the protected-files list to a deceased-files list after the protected files are no longer being processed; --.

UNITED STATES PATENT AND TRADEMARK OFFICE
CERTIFICATE OF CORRECTION

PATENT NO. : 6,178,429 B1
DATED : January 23, 2001
INVENTOR(S) : Scott Cherf It is certified that error appears in the above-identified patent and that said Letters Patent is hereby corrected as shown below:

<u>Column 8,</u>
Line 31, remove "and".
Line 32, after "removing" add -- the --.
Line 32, after "of" add -- the requested --.
Line 32, after "list" add -- and renaming the requested-files list to a deceased format --.

Signed and Sealed this

Thirtieth Day of August, 2005

JON W. DUDAS
*Director of the United States Patent and Trademark Office*